(12) United States Patent
Teboul

(10) Patent No.: US 7,198,762 B1
(45) Date of Patent: Apr. 3, 2007

(54) DEVICE FOR TREATING AN INTERNAL COMBUSTION ENGINE EXHAUST GASES

(76) Inventor: Daniel Teboul, 14, avenue Pierre Brossolette, Malakoff (FR) F-92240

( * ) Notice: Subject to any disclaimer, the term of this patent is extended or adjusted under 35 U.S.C. 154(b) by 725 days.

(21) Appl. No.: 10/070,932

(22) PCT Filed: Sep. 14, 2000

(86) PCT No.: PCT/FR00/02549

§ 371 (c)(1),
(2), (4) Date: Jul. 19, 2002

(87) PCT Pub. No.: WO01/19525

PCT Pub. Date: Mar. 22, 2001

(30) Foreign Application Priority Data

Sep. 14, 1999 (FR) .................... 99/11474

(51) Int. Cl.
*F01N 3/10* (2006.01)
*B01D 50/00* (2006.01)
*B01D 53/34* (2006.01)

(52) U.S. Cl. ...................... 422/174; 422/168; 422/170; 422/172; 422/177

(58) Field of Classification Search ................ 422/171, 422/174, 177, 186, 186.04; 60/275; 96/97, 96/55, 57, 58
See application file for complete search history.

(56) References Cited

U.S. PATENT DOCUMENTS 5,121,601 A * 6/1992 Kammel ...................... 60/275
5,492,677 A    2/1996 Yoshikawa ................... 422/174
5,787,704 A    8/1998 Cravero ........................ 60/274
6,003,305 A * 12/1999 Martin et al. ................. 60/274

FOREIGN PATENT DOCUMENTS

| GB | 0256325 | 2/1988 |
| GB | 0367587 | 5/1990 |
| WO | 9911909 | 3/1999 |

* cited by examiner

*Primary Examiner*—Alexa Neckel
*Assistant Examiner*—Kaity Handal
(74) *Attorney, Agent, or Firm*—Crowell & Moring LLP

(57) ABSTRACT

The invention concerns a device comprising at least an electrostatic filter (20) with corona effect comprising an emitting structure (29, 32, 33) and a collector structure (24). The invention is characterized in that the collector structure (24) comprises a plurality of cavities trapping the particles contained in the gas medium, such as gases of an internal combustion engine. The emitting structure (29, 32, 33) comprises a plurality of serrated plates such as ratchets (32) designed to be connected to a high voltage circuit. Preferably, the collector structure (24) comprises a separator formed of a wire mesh. Advantageously, said device is associated with an oxidation catalytic converter and/or a continuously regenerating mechanical filter and/or suction means.

17 Claims, 3 Drawing Sheets

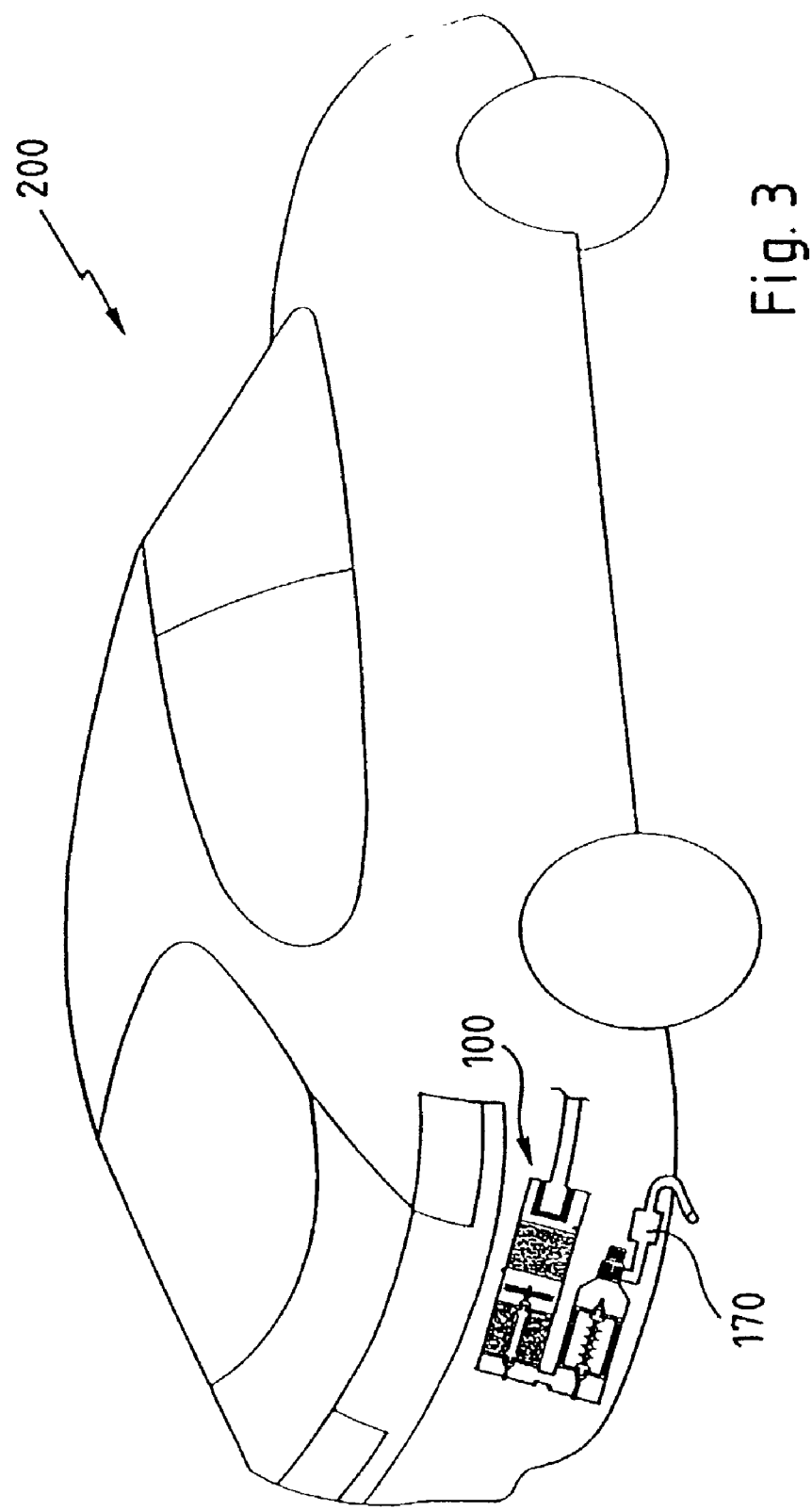

DEVICE FOR TREATING AN INTERNAL COMBUSTION ENGINE EXHAUST GASES

BACKGROUND AND SUMMARY OF THE INVENTION

The present invention relates to the treatment of a gaseous medium laden with particles and in particular of solid, liquid or gaseous pollutants or impurities contained in a gaseous medium, such as the exhaust gases from an internal combustion engine.

A particular, but not exclusive, application is purification of the exhaust gases of a diesel engine.

The pollutants issuing from exhaust systems include:
carbon compounds: $CO$, $CO_2$;
nitrogen compounds: $NO$, $NO_2$ (usually called nitrogen oxides $NO_x$) etc.,
organic compounds, such as hydrocarbons (HC) etc.;
sulphur compounds: $SO_2$, $SO_3$, etc.;
organic particles;
etc.

Emissions of organic particles are especially characteristic of diesel engines and are composed of a carbon-containing material (soot), on which various organic species are adsorbed (SOF: Soluble Organic Fraction).

Numerous methods and devices for treating the exhaust gases from an internal combustion engine have already been proposed previously.

In particular, the use of oxidation catalysts on a particulate support or a monolithic support is known, especially for oxidizing CO and unburnt hydrocarbons.

For the particles from diesel engines, there are also trapping systems that can be regenerated.

Devices for treating gases employing corona-effect electrostatic filters are also known, in particular from documents EP-A-0299 197 (U.S. Pat. No. 4,871,515) and U.S. Pat. No. 4,478,613.

The devices in these two documents operate according to different principles. Thus, in the case of the device to which the first of these two documents relates, the particles are to be trapped in a collecting structure, whereas with the device described in the second of these two documents the particles form agglomerates on the collecting structure which are then detached from this collecting surface and are entrained by the stream of gases circulating in the device, before being separated from the latter by means of a mechanical separator.

The invention aims to improve the known treatment devices, in particular with respect to their efficiency.

It also aims to provide a treatment device that is compact, inexpensive and easy to manufacture.

To this end, it proposes a device for treating a particle-laden gaseous medium, having at least one corona-effect electrostatic filter comprising:
a longitudinal casing;
a longitudinal channel for the gases, extending in the casing and with its two opposite ends adjacent to the gas inlet and outlet of the electrostatic filter, respectively;
an emitting structure extending longitudinally and roughly at the centre of the channel; and
a collecting structure extending longitudinally between the channel and the casing and comprising a plurality of cavities forming sites for trapping the particles contained in the gaseous medium;
characterized in that
the emitting structure comprises a plurality of serrated plates arranged transversely to the longitudinal direction of the channel.

A treatment device of this kind meets the requirements that have just been mentioned. In particular, this device proves to be especially efficient in terms of collection of particles, as will be described in more detail later.

For reasons of efficiency of collection and ease of manufacture, the serrated plates are constituted of stars that are to be connected to a circuit supplying a stabilized high voltage (several kV).

A washer with a star-shaped central recess might, for example, also be suitable.

Other solid or perforated geometric shapes preferably having a plurality of vertices directed towards the collecting structure can be arranged between these stars. These geometric shapes can, for example, consist of washers or rings perforated with holes of various diameters.

A possible form of the circuit supplying a stabilized high voltage consists of providing a converter or transformer supplying a voltage between 0 and 15 kV controlled by a regulator.

Preferably, the voltage applied is negative and greater than about 6 kV.

Also for reasons of efficiency, the collecting structure preferably includes a separator or mat-type eliminator made from metal wire fabric.

According to the preferred embodiment, the metallic fabric has a herringbone structure that facilitates penetration of the particles into the fabric.

As a variant, it will also be possible to employ, for example, a collecting structure provided with grooves, channels, flutes etc.

According to the preferred embodiment, the separator is of cylindrical shape and surrounds the serrated plates of the emitting structure, aligned on the axis of the cylindrical shape of the collecting structure.

Advantageously, in this case, the emitting structure and the collecting structure are mounted on a supporting structure, with which they form a removable filter cartridge of the treatment device.

In the case of a treatment device in which the gas inlet and outlet extend transversely to the longitudinal channel for the gases, the serrated plates are, preferably, carried by a rod connected to the circuit supplying a high voltage and which is carried, at each of its ends, by an insulator protected by a bell-shaped cover (bell).

To increase the efficiency of collection, the treatment device can, advantageously, have a second electrostatic filter, original in itself, and having metal stars carried by one face of a perforated metal disk connected to the circuit supplying a stabilized high voltage and mounted upstream of a separator of cylindrical shape, made from a metal wire fabric.

For treating the gaseous pollutants, the treatment device preferably also has an oxidation catalyst with a monolithic support upstream of the electrostatic filter or filters.

This treatment device can also include a mechanical filter upstream of the electrostatic filter or filters and, if appropriate, of the oxidation catalyst, for example for retaining oily emulsions by using a devesiculating filter, for example of the inverted-V impact type.

In accordance with a configuration that is original in itself, the mechanical filter comprises a metal mesh filter, i.e. it is made from a metal wire fabric or metallic fabric, defining a forced channel for the gaseous medium entering the treatment device and associated with an electrical resistance for raising the temperature of the gaseous medium.

This filtering structure makes it possible to raise the temperature of the gaseous medium to the working temperature of the oxidation catalyst. In particular, however, it provides a treatment device that is especially compact, by causing combustion of particles retained in the filter. The result of this is that a smaller quantity of particles has to be treated by the electrostatic filter or filters, and it is therefore possible to reduce the size of the treatment device.

The said treatment device can also be provided with an inlet for air for oxidation and/or an inlet for air for cleaning.

To combat the backpressure effects that adversely affect the operation of an internal combustion engine and are associated with a device of this type, the latter can also be provided with aspirating means downstream of the electrostatic filter or filters.

In the preferred embodiment, the treatment device has, in addition, at least one cylindrical casing for housing the electrostatic filter or filters and, if appropriate, the oxidation catalyst and/or the mechanical filter.

The present invention relates, finally, to a vehicle equipped with a treatment device as defined above.

Other objects, characteristics and advantages of the present invention will become clear from the description given below, which refers to the appended drawings in which:

BRIEF DESCRIPTION OF THE DRAWINGS

FIG. 3 is a diagram illustrating a motor vehicle equipped with the device shown in FIG. 2.

DETAILED DESCRIPTION OF THE DRAWINGS

Before proceeding to describe these diagrams, we shall briefly recall the operating principle of a corona-effect electrostatic filter.

An electrostatic filter of this type is based on a combination of the aspect of particle charging by creating ions, and collection of the particles under the action of a local electric field. The energy for this phenomenon of excitation and ionization can be supplied by electromagnetic radiation or by transfer of kinetic energy by impacts.

The corona effect corresponds to ionization of the gas when the electric field reaches a breakdown gradient.

Figure 1:
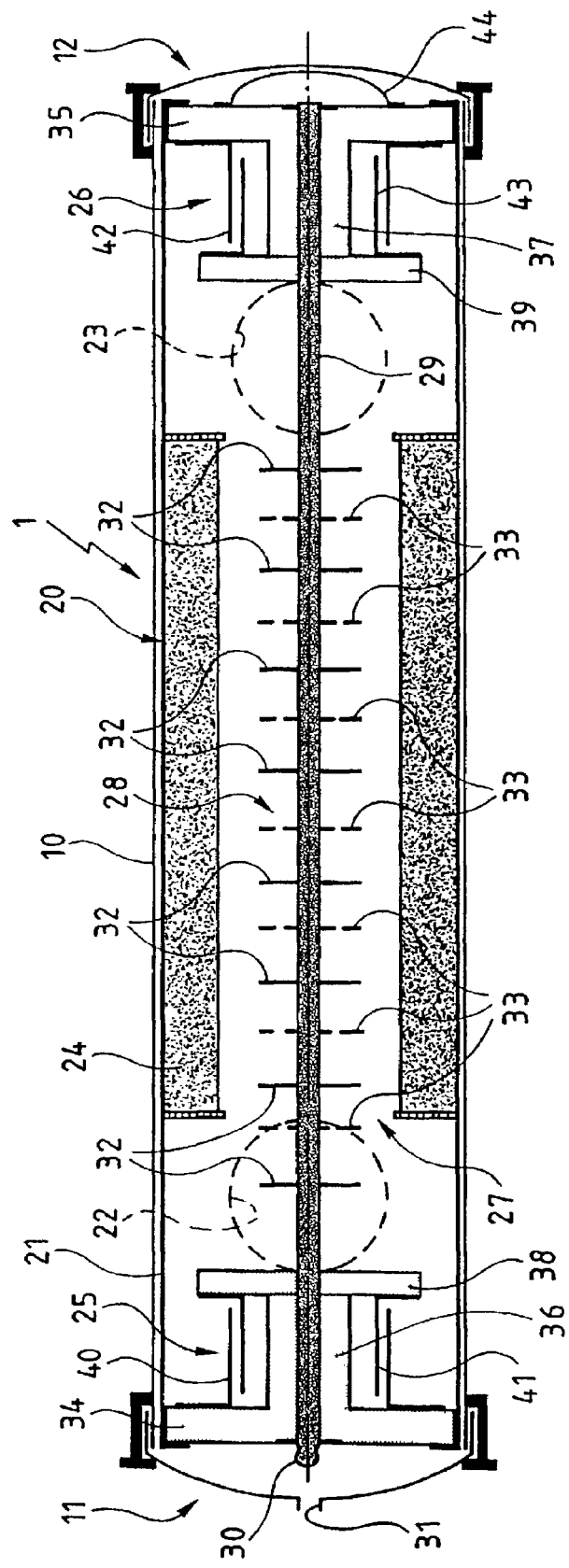
FIG. 1 is a schematic diagram of a device for treating exhaust gases according to a preferred embodiment of the present invention.

The device 1 for treating the exhaust gases from an internal combustion engine in FIG. 1 has at least one longitudinal cylindrical casing 10 closed at its ends by two covers 11 and 12 and which houses a cartridge 20 provided with a corona-effect electrostatic filter.

This cartridge 20 has a cylindrical cage 21 made of perforated sheet metal forming the casing of the said cartridge. Two diametrically opposite openings 22 and 23 are made in the said cage 21 to allow the gases to enter and leave cartridge 20. These openings 22 and 23 communicate with corresponding channels of casing 10 for gas inlet and outlet. Each of these openings 22 and 23 is, in addition, arranged in the longitudinal direction of cartridge 20, between a collecting structure 24 and an insulator 25, 26 carrying the emitting structure 27 of the corona-effect electrostatic filter.

The collecting structure 24 is made in one piece from metal wire fabric, surrounding the emitting structure 27 between the two openings 22 and 23. In this way it delimits a longitudinal cylindrical channel 28 for the gases, the two opposite ends of which are adjacent to the two openings 22 and 23. The metallic fabric of the said collecting structure 24 has, in addition, a plurality of cavities forming sites for trapping the particles contained in the gaseous medium passing through channel 28, as will be described in more detail later.

Furthermore, the herringbone structure of this fabric facilitates penetration of the particles into the bulk of the fabric.

The emitting structure 27 has a central rod 29 that extends axially and is carried by the insulators 25 and 26 that it passes over. At one of its ends it has a terminal 30 for connection to a circuit supplying a stabilized high voltage (not shown in FIG. 1) of the type comprising a converter that supplies a negative voltage between 0 and 15 kV, controlled by means of a regulator. The said converter is to be connected to the battery of a vehicle to which treatment device 1 is fitted.

An opening 31 made in cover 11 permits passage of a connecting cable from terminal 30 to the said high-voltage circuit. Cage 21, and therefore collecting structure 24, are for their part connected to earth.

In the embodiment illustrated in FIG. 1, the serrated plates forming emitting components, mounted on rod 29, are made up of several metallic stars 32, i.e. a solid central support provided at its periphery with triangular arms whose points are directed towards collecting structure 24. The said stars 32 are arranged transversely to the longitudinal direction of channel 28 and the first one of them is located opposite gas inlet opening 22. Here, the number of arms is eight.

Furthermore, the said stars 32 alternate with metal washers or rings 33 that are perforated with holes of various diameters. Here, these washers or rings 33 have the same diameter as the stars 32 and are mounted on rod 29 so as to be arranged transversely to the longitudinal direction of channel 28.

The insulators 25 and 26 are made of vitrified ceramic and each has an end disk 34, 35 covering the openings defined by cage 21 at its two longitudinal ends. A tubular central part 36, 37 surrounds rod 29 and extends the corresponding disk 34, 35 towards the interior of cage 21. The outside diameter of each of these tubular parts 36, 37 is less than that of the disks 34, 35.

In addition, a bell 38, 39 is fixed on each of these tubular parts 36, 37, on the side of the latter opposite the side with connection to the respective disk 34, 35.

These bells 38, 39, with diameter smaller than that of disks 34, 35, are close to the openings 22 and 23 and have the function of protecting the insulators 25 and 26 from the particle-laden gaseous medium.

Each of the tubular parts 36, 37 of insulators 25 and 26 is, in addition, also protected by two concentric deflectors surrounding the said tubular parts 36, 37.

The deflectors fixed respectively to disk 34 and to bell 38 have the numerical designations 40 and 41 whereas the deflectors fixed respectively to disk 35 and to bell 39 have the numerical designations 42 and 43. Each pair of concentric deflectors thus forms a baffle for the flow of gas in cartridge 20.

Finally, a handle 44 fixed to disk 35 permits easy withdrawal of cartridge 20 from casing 10.

In operation, the stars 32 not only act as emitting structures of the corona-effect electrostatic filter, but also make it possible to generate turbulence and local perturbations, notably having the effect of deflecting the particles towards the collecting structure 24 while accelerating them, though without causing particles already trapped in the said collecting structure 24 to fly up again.

The said turbulence and perturbations are increased by the presence of the perforated washers or rings 33 arranged between the stars 32.

The efficiency of such a system was measured in the presence and in the absence of stars. In both cases, the treatment device was without washers or rings, of the type bearing the numerical designation 33 in FIG. 1. The treatment device that was tested consisted of a metal casing containing two metallic filter cartridges of the type bearing the numerical designation 20 in FIG. 1. The electrostatic filters of these cartridges was supplied with a stabilized high voltage of −10 kV.

The device was mounted at the back of a Peugeot® 406 HDI vehicle equipped with a catalyst, but from which the silencer had been removed.

The tests were carried out on rolling roads according to the UDC (urban driving cycle) and EUDC (extra urban driving cycle) vehicle type-approval tests. The collection efficiency of the treatment device was measured by the weight difference between the raw emissions (without treatment device) and the emissions in the presence of treatment devices fitted at exhaust outlet.

These tests were performed on the basis of standard NF EN ISO 8178-1 to 8.

These tests revealed unexpected results. In fact, the presence of stars made it possible to double the collection efficiency and achieve particularly high average values of the order of 80%.

It will also be appreciated that the backpressure generated in this treatment device is minimal and does not increase as collecting structure 24 becomes clogged.

It should also be noted in this regard that it is relatively easy to clean the said collecting structure 24. In fact, all that is required is to withdraw the cartridge from casing 10 by sliding it in the latter, and then immerse it for example in an ultrasonic bath.

As a variant, cleaning can be effected by incorporating an electrical resistance in collecting structure 24 for the purpose of burning the particles and regenerating the collecting structure 24 or by injecting air and aspirating by means of a Venturi system.

Furthermore, increase in thickness of the metallic fabric of the said collecting structure 24 also makes it possible to lessen the noise produced by the gases during their passage through treatment device 1.

It will further be appreciated that the said treatment device 1 makes it possible to produce ozone, in particular by reducing, to an acceptable extent, the space between stars 32 and the collecting structure 24. This ozone has the advantageous effect of oxidizing certain gaseous compounds present in exhaust gases.

Figure 2:
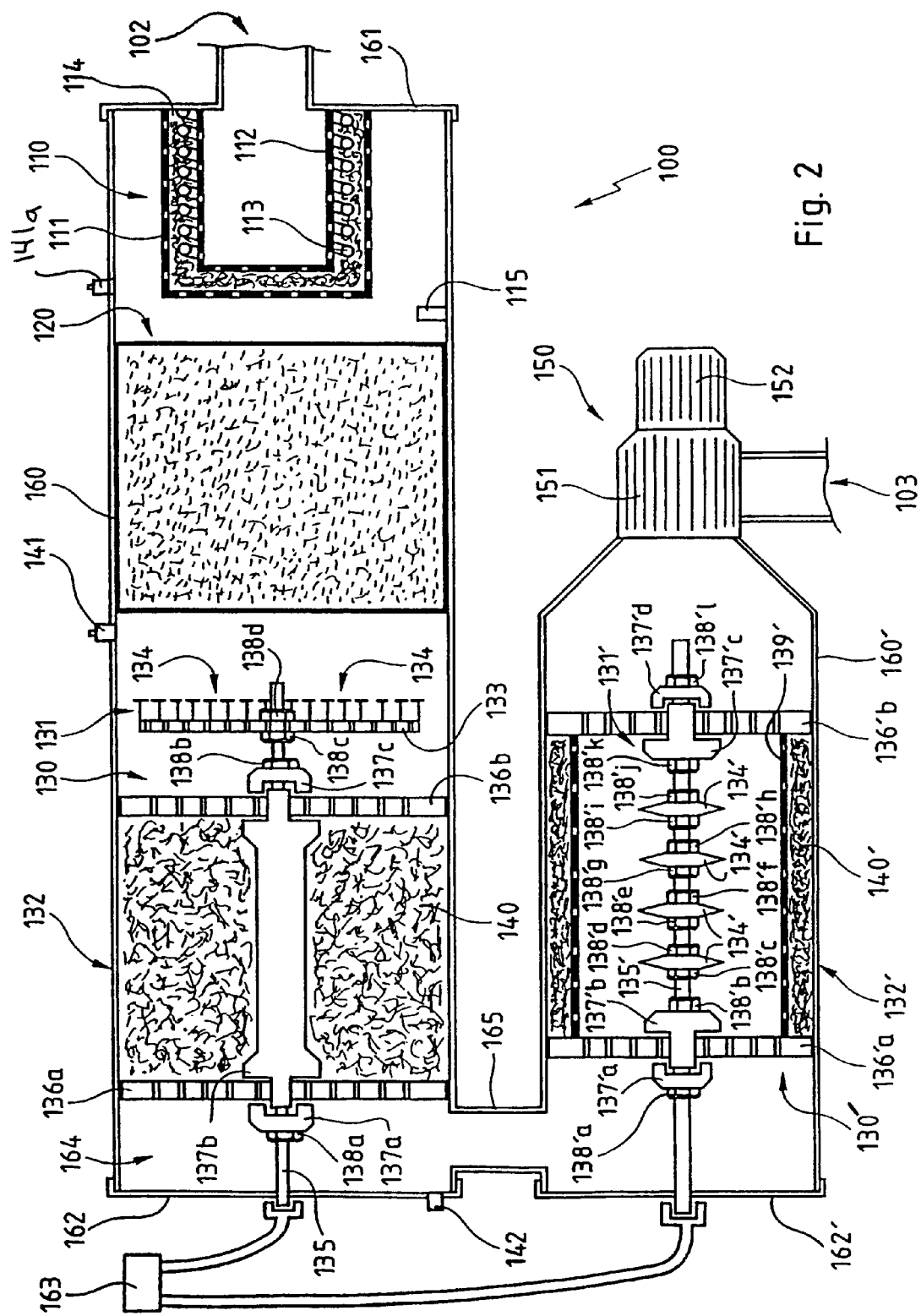
FIG. 2 is a schematic diagram of a device for treating exhaust gases in several stages, according to another embodiment of the present invention.

The multi-stage treatment device 100 in FIG. 2 includes, from upstream to downstream, i.e. between an inlet 102 and an outlet 103, a mechanical filter 110, an oxidation catalyst 120, a first electrostatic filter 130, a second electrostatic filter 130' and aspirating means 150.

As with device 1 in FIG. 1, it is a device for treating exhaust gases from a diesel engine.

All of these elements are housed in two cylindrical casings 160, 160', heat-insulated at least at the location of filter 110 and of oxidation catalyst 120, which communicate with one another, and form, in the case of the motor vehicle in FIG. 3, a part of the exhaust system between the exhaust manifold and the silencer of the said vehicle.

In this case the mechanical filter 110 is fixed to a removable cover 161, sealing the end upstream of the longitudinal cylindrical casing 160 and provided with the inlet 102.

This mechanical filter 110 has two concentric cylinders made of perforated sheet metal 111, 112 having the form of a strainer. A heating electrical resistance 113 and a multilayer metallic fabric 114 are placed between these two cylinders 111, 112.

As can be seen in FIG. 2, this mechanical filter 110 defines a forced channel for the exhaust gases entering the treatment device 100 via inlet 102.

The electrical resistance 113 is known in itself, of the type having a temperature control. In this regard, a temperature-detecting probe 115 is provided in the region of filter 110. Furthermore, in the present case this resistance 113 is in the form of a spiral and surrounds the inner perforated cylinder 112.

Moreover, it is intended to be supplied by the vehicle's battery to raise the temperature of the exhaust gases passing through mechanical filter 110.

The said mechanical filter 110 makes it possible, if necessary, to bring the exhaust gases up to the working temperature of the oxidation catalyst 120, and trap at least a proportion of the particles contained in the exhaust gases and bring about their combustion.

In this regard, in order to lower the temperature at which oxidation of the carbon-containing particles commences, the metallic fabric 114 is, in this case, coated with copper oxide.

In practice, the electrical resistance 113 will therefore be chosen for raising the temperature of the exhaust gases to at least 200–300° C., the maximum being between 700 and 800° C.

The exhaust gases leaving the continuous-regeneration mechanical filter 110 then pass through oxidation catalyst 120. The latter has a monolithic support made of ceramic or of metal and is mainly intended for ensuring the oxidation of carbon monoxide (CO), nitric oxide (NO) and hydrocarbons (HC).

In this regard, if we wish to favour the oxidation of CO and hydrocarbons, to the detriment of NO, it would be possible to install an air inlet valve 141a upstream of oxidation catalyst 120. In this case this air will also serve to favour combustion in filter 110.

The exhaust gases leaving oxidation catalyst 120 will then be treated by the first corona-effect electrostatic filter 130, which is intended to trap at least a proportion of the particles contained in the exhaust gases that were not retained by mechanical filter 110.

This electrostatic filter 130 has an emitting structure 131 upstream of a collecting structure 132. More precisely, the emitting structure comprises a perforated disk 133 that has metal stars 134 projecting from the face of disk 133 opposite the oxidation catalyst 120.

This perforated disk 133 is carried by a threaded rod 135 that extends axially and is carried by two disks 136a, 136b of perforated sheet metal enclosing the collecting structure 132. These disks 136a, 136b are larger in diameter than disk 133 and fit snugly in casing 160.

The downstream end of threaded rod 135 passes through a removable cover 162 sealing the downstream end of casing 160. This end is to be connected to a transformer box 163, which is to be connected to the vehicle's battery so that a stabilized high voltage (in practice about 110 kV) can be applied to electrostatic filter 130.

In this regard, in order to isolate the emitting structure 131 from the collecting structure 132, the threaded rod 135 passes through the perforated disks 136a, 136b via ceramic insulators 137a–137c.

Nuts 138a–138d are arranged on either side of insulators 137a–137c and of perforated disk 133 for joining together the disks 133, 136a and 136b and the threaded rod 135. Moreover, it will be observed, in the case of the present embodiment, that these disks 133, 136a and 136b extend perpendicularly to the threaded rod 135.

The collecting structure 132, connected to earth here, comprises a metallic fabric 140, surrounding the insulator 137b and the rod 135, forming a plurality of cavities and extending between insulator 137b and the casing 160. As with metallic fabric 114, this last-mentioned fabric 140 is in this case multilayer.

As is also shown in FIG. 2, the shafts carrying the stars 134 extend axially. Furthermore, in this case these stars 134 have eight triangular arms.

In addition, there is also provided, in the region of the first electrostatic filter 130, a system for cleaning by air, permitting regular cleaning before dismantling it for more thorough cleaning. This system includes, on the one hand, a non-return valve 141 for air injection at one of the ends of the receiving zone of the first electrostatic filter 130 and a connector 142 mounted on cover 162, to which aspirating means will be connected when it is desired to clean the electrostatic filter 130.

By the action of electrostatic filter 130, the particles that were able to pass through mechanical filter 110 are charged and then attracted by the collecting structure 132, where they are trapped in the porous volume formed by the metallic fabric 140.

Through the use of stars 134, the structure 131 forming the emitting electrode permits efficient charging of the particles, whereas the collecting structure 132 permits efficient retention of at least a proportion of the particles passing through electrostatic filter 130, within the cavities of fabric 140.

Furthermore, perforated disk 133 ensures optimum distribution of the exhaust gases prior to passage through the collecting structure 132.

The exhaust gases leaving the electrostatic filter then arrive in a pressure reduction chamber 164 formed by the zone located between the downstream end of electrostatic filter 130 and the cover 162. This chamber 164 communicates by a cylindrical connector 165 with the interior of the cylindrical casing 160', so as to convey the exhaust gases to the second electrostatic filter 130'.

The latter is similar to that shown in FIG. 1, in that the emitting structure 131' is formed by metal stars 134' mounted on a threaded rod 135'.

These metal stars, also with eight arms here, are thus aligned on the axis of casing 160'. Furthermore, they have an angular offset relative to one another.

In addition, there are perforated metal disks 136'a, 136'b, insulators 137'a–137'd and nuts 138'a–138'l.

Moreover, collecting structure 132' is formed by a cylinder of perforated sheet metal 139' extending axially, surrounding the stars 134' and surrounded by a metallic fabric 140', forming a plurality of cavities.

The emitting structure 131' is, in this case, also supplied with a stabilized high voltage (5 kV) by means of transformer box 163.

On account of this second corona-effect electrostatic filter 130', it is possible for the exhaust gases to be treated once more in order to retain an additional quantity of particles, in particular those that might have escaped from corona-effect electrostatic filter 130 by flying back up.

It will also be noted that these electrostatic filters 130, 130' consist of cartridges that are easily installed in or removed from casings 160 and 160', respectively, after removing covers 162 and 162', respectively.

To counter the backpressure effects that are harmful to proper operation of the engine, treatment device 100 preferably has aspirating means 150 downstream of the second electrostatic filter 130' and before the outlet 103. These aspirate the exhaust gases circulating in the casings 160 and 160', and comprise, for this purpose, an aspirating turbine 151 driven by a motor 152.

As shown in FIG. 3, the device for treating exhaust gases 100 is installed in the exhaust system of a diesel-engined motor vehicle 200, using known means of installation, between the exhaust manifold and the silencer 170 of the said vehicle.

Operation of the electrical resistance 113, transformer box 163 and the aspirating means 150 can be managed by the engine management systems that are already present on vehicle 200, by adapting them, or alternatively by an additional management system that is independent or is coupled to the existing systems.

With a treatment device 100 of this type, the exhaust gases from the vehicle 200 are treated particularly efficiently, both from the standpoint of the gaseous pollutants and of the polluting particulates. Moreover, this device is easily installed on vehicle 200 and is easy to maintain. Furthermore, its cost price is relatively moderate in relation to the advantages it provides.

It will be noted in general that the treatment device of the present invention can be used for treating all types of exhaust gases from an internal combustion engine (diesel, petrol, gas) of any vehicle (car, boat, etc.). It can even be installed on a truck for treating the exhaust gases from a vehicle undergoing repairs in a garage, or in underground tunnels where the gaseous environment is laden with pollutants.

Of course, the present application is in no way limited to the embodiment that was chosen and illustrated, but encompasses any variant within the capability of a person skilled in the art.

In particular, the oxidation catalyst with monolithic support can be replaced with an oxidation catalyst with a particulate support or any other oxidation catalyst, such as a three-way catalytic converter, or can simply consist of an oxidation catalyst that is already present on the vehicle.

In addition, it is possible to employ several electrostatic filters of the type shown in FIG. 1, one after another, and if necessary in several cylindrical casings, if the cylinder capacity of the internal combustion engine so requires. It is also possible to use the first electrostatic filter 130 without the second electrostatic filter 130' and vice versa.

The cylinders of perforated sheet metal used in the embodiment of FIG. 1 can also be replaced with cylinders made from wire mesh or from expanded metal.

Other mechanical filters, such as inverted-V impact-type devesiculating filters or finishing filters, can supplement the treatment device 100 in FIG. 2 or replace filter 110 or one of the two electrostatic filters 130, 130'. The use of these mechanical filters may be of interest for optimizing the distribution of the gases or for reducing the noise generated by the device at its outlet.

The electrical resistance 113 can be replaced with a resistance having a different configuration. Discontinuous operation of the latter can also be envisaged.

A system for cleaning with air can also be envisaged for cleaning the second electrostatic filter 130'.

The invention claimed is:

1. A device for treating a particle-laden gaseous medium, having at least one corona-effect electrostatic filter, comprising:
    a longitudinal casing;
    a longitudinal channel for the gaseous medium, the channel extending in the casing and having two opposite ends adjacent to a gas inlet and outlet of the electrostatic filter, respectively;
    an emitting structure extending longitudinally and roughly at the center of the channel; and
    a collecting structure extending longitudinally between the channel and the casing and comprising a plurality of cavities forming sites for trapping the particles contained in the gaseous medium, wherein the emitting structure comprises a plurality of serrated plates arranged transversely to the longitudinal direction of the channel.

2. A treatment device according to claim 1, wherein the serrated plates includes stars that are to be connected to a circuit supplying a stabilized high voltage.

3. A treatment device according to claim 1, wherein the collecting structure comprises a separator made from metal wire fabric.

4. A treatment device according to claim 3, wherein the separator is of a cylindrical shape and surrounds the serrated plates of the emitting structure, aligned on the axis of a cylindrical shape of the collecting structure.

5. A treatment device according to claim 1, wherein the emitting structure and the collecting structure are mounted on a supporting structure with which they form a removable filter cartridge of the treatment device.

6. A treatment device according to claim 1, wherein the serrated plates alternate with perforated washers or rings that are arranged transversely to the longitudinal direction of the channel.

7. A treatment device according to claim 1, wherein the gas inlet and outlet extend transversely to the longitudinal channel for the gaseous medium, and, wherein the serrated plates are carried by a rod connected to a circuit that supplies a stabilized high voltage and which is carried, at each of its ends, by an insulator protected by a bell.

8. A treatment device according to claim 7, comprising a second electrostatic filter having metal stars carried by one face of a perforated metal disk connected to the circuit supplying a stabilized high voltage and mounted upstream of a separator of cylindrical shape, made from a metal wire fabric.

9. A treatment device according to claim 1, comprising an oxidation catalyst with monolithic support, upstream of the electrostatic filter.

10. A treatment device according to claim 9, comprising a mechanical filter upstream of the electrostatic filter and of the oxidation catalyst.

11. A treatment device according to claim 10, wherein the mechanical filter comprises a metal mesh filter, defining a forced channel for the gaseous medium entering the treatment device and associated with an electrical resistance that is able to raise the temperature of the gaseous medium.

12. A treatment device according to claim 1, comprising at least one of an inlet for oxidation air upstream of an oxidation catalyst and an inlet for cleaning air upstream of at least one of the at least one electrostatic filter.

13. A treatment device according to claim 1, comprising aspirating means downstream of the electrostatic filter.

14. A treatment device according to claim 11, comprising at least one cylindrical casing for housing the electrostatic filter and the oxidation catalyst and/or the mechanical filter.

15. A vehicle, comprising:
    an internal combustion engine, and
    an exhaust system for exhausting a gaseous medium from the internal combustion engine, said exhaust system including a device for treating the gaseous medium having at least one corona-effect electrostatic filter, said device including
        a longitudinal casing;
        a longitudinal channel for the gaseous medium, the channel extending in the casing and having two opposite ends adjacent to a gas inlet and outlet of the electrostatic filter, respectively;
        an emitting structure extending longitudinally and roughly at the center of the channel; and
        a collecting structure extending longitudinally between the channel and the casing and comprising a plurality of cavities forming sites for trapping the particles contained in the gaseous medium, wherein the emitting structure comprises a plurality of serrated plates arranged transversely to the longitudinal direction of the channel.

16. A treatment device according to claim 1, further comprising a finishing filter.

17. A treatment device according to claim 2, further comprising a finishing filter.

* * * * *